United States Patent [19]

Tokoli et al.

[11] Patent Number: 4,508,650

[45] Date of Patent: Apr. 2, 1985

[54] PROCESS FOR THE PREPARATION OF HIGH PURITY PHTHALOCYANINE PIGMENTS

[75] Inventors: Emery G. Tokoli, Rochester; Anthony M. Horgan, Pittsford; Kathleen M. Carmichael, Williamson, all of N.Y.

[73] Assignee: Xerox Corporation, Stamford, Conn.

[21] Appl. No.: 517,868

[22] Filed: Jul. 27, 1983

[51] Int. Cl.³ .................... C07D 487/22; C09B 47/04
[52] U.S. Cl. ..................... 260/245.86; 8/661
[58] Field of Search .................... 260/245.86

[56] References Cited

U.S. PATENT DOCUMENTS

| | | | |
|---|---|---|---|
| 2,375,120 | 5/1945 | Loukomsky et al. | 260/314.5 |
| 2,378,283 | 2/1943 | Bucher | 241/15 |
| 2,840,568 | 6/1958 | Brouillard et al. | 260/314.5 |
| 2,859,219 | 11/1958 | Randall et al. | 260/314.5 |
| 2,914,537 | 11/1959 | Randall et al. | 260/314.5 |
| 2,964,531 | 12/1960 | Kirby et al. | 260/314.5 |
| 3,657,272 | 4/1972 | Brach et al. | 260/314.5 |
| 3,713,857 | 1/1973 | Shapiro | 106/288 Q |
| 3,932,180 | 1/1976 | Griffiths et al. | 96/1.5 |
| 3,963,743 | 6/1976 | Stepp | 260/314.5 |
| 4,031,109 | 6/1977 | Griffiths et al. | 206/314.5 |
| 4,239,549 | 12/1980 | Fabian et al. | 106/308 Q |

Primary Examiner—Robert T. Bond
Attorney, Agent, or Firm—E. O. Palazzo

[57] ABSTRACT

A process for the preparation of pigments of high purity which comprises reacting in the presence of an organic solvent an appropriate impure pigment with an organic acid of the formula R-X, or comprises reacting an appropriate impure pigment with an organic acid of the formula R-X, and subsequently adding an organic solvent to the resulting organic mixture, adding a precipitating agent to the resulting solution mixture, followed by separation of the desired pure pigment from the reaction mixture, wherein R is an alkyl group, containing from about 4 carbon atoms to about 22 carbon atoms, or an aryl group containing from about 6 carbon atoms to about 24 carbon atoms, and X is a group capable of yielding anions.

28 Claims, No Drawings

PROCESS FOR THE PREPARATION OF HIGH PURITY PHTHALOCYANINE PIGMENTS

This invention is generally directed to processes for the preparation of pigments in a high purity, including photoconductive pigments; and more specifically the present invention is directed to an improved process for preparing phthalocyanines of high purity by the treatment thereof with organic acids containing large anions, which acids can, for example, be substituted, or unsubstituted long straight chain hydrocarbons, or branched chain hydrocarbons. In one important embodiment of the present invention, phthalocyanines, such as vanadyl phthalocyanines, of high purity, 99.95 percent, are obtained by subjecting the appropriate crude phthalocyanines to treatment with certain organic acids. Phthalocyanines prepared from such a process can be used for a number of purposes wherein high purity materials are required, including, for example, in photoconductive imaging members incorporated in xerographic imaging devices. Accordingly, for example, phthalocyanines prepared in accordance with the process of the present invention, such as vanadyl phthalocyanines can be selected as the photogenerating composition for use in layered photoresponsive imaging devices comprised of photogenerating layers and transport layers. Moreover, certain phthalocyanines prepared in accordance with the process of the present invention, such as vanadyl phthalocyanines are useful as photoconductive compositions, or photoconductors in photoresponsive devices, which devices have a sensitivity to wave lengths extending beyond the 8,000 Angstrom unit range, such as those emitted by gallium arsenide solid state lasers.

The selection of phthalocyanines as xerographic imaging members is well known in the art. Thus, for example, the use of vanadyl phthalocyanine as a photogenerating pigment in a layered photoresponsive imaging device, which pigment can be optionally dispersed in an inactive resinous binder material is disclosed in the prior art. These members can be subjected to a uniform electrostatic charge for the purpose of sensitizing the surface of the photoconductive layer, followed by exposure of the image to activating electromagnetic radiation, such as light, which selectively dissipates the charge in the illuminated areas of the photoconductive insulating member, and wherein a latent electrostatic image is formed in the non-illuminated areas. The resulting image may then be developed and rendered visible by depositing thereon toner particles.

Recently there has been described layered photoresponsive devices including those comprised of photogenerating layers, and charge transport layers as described, for example, in U.S. Pat. No. 4,265,990, the disclosure of which is totally incorporated herein by reference. Examples of photogenerating pigments disclosed include trigonal selenium, and phthalocyanines, while examples of transport layers that may be used are comprised of certain diamines dispersed in inactive resinous binders.

There is disclosed in U.S. Pat. No. 4,031,109 various known methods for preparing metal phthalocyanines, including the reaction of phthalonitrile with a metal or metal salt in quinoline or trichlorobenzene; the reaction of phthalic anhydride, phthalic acid, or phthalamide, urea metal salts, and a catalyst; the reaction of ortho-cyanobenzamide with a metal; and the reaction of phthalocyanine or replaceable metal phthalocyanine with a metal forming a more stable phthalocyanine. Further, it is disclosed in this patent that X-metal-free phthalocyanines can be prepared by extended dry milling or grinding of the alpha or beta form of metal-free phthalocyanine. Moreover, this patent describes the preparation of X-form metal phthalocyanines and phthalocyanine compounds by heating any metal phthalocyanine polymorph or phthalocyanine compound to form about 600° C. to about 650° C., and then preferably, rapidly cooling to from about 10° C. to about 40° C. in order to avoid decomposition of the X-form product. The phthalocyanines prepared in accordance with these processes are useful as electrophotographic imaging members, however, until recently phthalocyanines have been prepared almost exclusively for use as a pigment, where color, light fastness, dispersability, and the like are prime considerations, and the purity of the pigment is only of incidental importance. Therefore, the processes involved very often introduce metals, complex organic materials, and/or inorganic substances into the pigment, which are very difficult to remove, reference, for example, the text by Moser and Thomas, on Phthalocyanine Compounds, Rhinehold Publishing Company, pages 104 to pages 189.

Also, in U.S. Pat. No. 3,932,180 there is disclosed a process for the direct synthesis of the X-form of metal-free phthalocyanine from the corresponding alpha form of metal-free phthalocyanine, by initially providing a substrate having deposited thereon alpha metal-free phthalocyanine. The deposited material is at least partially converted directly to the X-form by heating, at a rate in excess of from about 10° C. per minute, to a temperature in the range of from about 220° C. to about 400° C. It is further disclosed in this patent that the X-form of metal-free phthalocyanine prepared by the method described has rapid photoresponse in the red and near infrared regions of the spectrum, and thus can be used as the photoresponsive medium for an electrophotographic imaging member.

Further, there is disclosed in U.S. Pat. No. 3,657,272 a process for preparing the X-form of metal-free phthalocyanine, by mixing phthalonitrile in an ammonia-saturated alkylalkanolamine solvent, followed by seeding the mixture with a catalytic amount of the X-form of phthalocyanine, heating the mixture to a reflux temperature, and maintaining this temperature for about 20 to about 70 minutes. Other patents disclosing processes and uses for various phthalocyanines include U.S. Pat. Nos. 3,926,629, 4,197,242, and 4,031,109.

Phthalocyanines selected for photoconductive imaging members must be of high purity, since the presence of impurities has a tendency to adversely affect the imaging properties of the photoconductive member including the electrical properties thereof, causing the copy quality obtained with such devices to be relatively poor in comparison to devices wherein vanadyl phthalocyanine of a high purity is used. While processes are presently available for obtaining phthalocyanines of high purity, they involve a number of complex chemical and physical processing steps, and these processes consume a substantial amount of time, for example, up to about 1 month to obtain the phthalocyanines of the purity desired. Moreover, the prior art processes require extensive efforts which increase the cost of the resulting product in view of, for example, the necessity for high capital cost equipment. In addition, in the prior art processes generally there is not consistently obtained phthalocyanines of high purity levels as required for xerographic applications.

There thus continues to be a need for improved processes for preparing phthalocyanines in high purity. Additionally, there continues to be a need for a simple economical chemical process for preparing phthalocyanines in high purity. There also continues to be a need for improved processes for obtaining phthalocyanines, such as vanadyl phthalocyanines, which processes involve a minimum number of process steps, and do not require extended time periods for completion thereof. Additionally, there continues to be a need for improved processes for purifying vanadyl phthalocyanine.

OBJECTS OF THE INVENTION

It is an object of the present invention to provide purification processes for pigments which are capable of forming salts, or capable of being protonated using certain organic acids as reagents.

In a further object of the present invention there is provided purification processes for obtaining pigments, especially phthalocyanine pigments of high purity.

Another object of the present invention resides in the provision of improved purification processes for preparing phthalocyanines, such as vanadyl phthalocyanines, in a purity of 99.99 percent or greater.

An additional object of the present invention resides in the provision of a simple economical process for preparing vanadyl phthalocyanine of high purity from crude impure vanadyl phthalocyanine.

An additional object of the present invention resides in the provision of a process for preparing vanadyl phthalocyanine of high purity by treating crude vanadyl phthalocyanine with an organic acid, yielding large anions with solubilizing properties in organic solvents.

In yet another object of the present invention there is provided an improved process for preparing vanadyl phthalocyanine of a high purity, wherein the vanadyl phthalocyanine is solubilized with an organic acid in the presence of organic solvents thereby enabling a purification from these solvents.

In yet a further object of the present invention there is provided an improved purification process for obtaining certain squaraine compositions, including known squaraines, such as hydroxy squaraines, alkyl squaraines, unsubstituted squaraines, and julolidinyl squaraines.

These and other objects of the present invention are accomplished by the provision of an improved process for the preparation and/or purification of phthalocyanines of high purity, which comprises reacting in the presence of an organic solvent an appropriate crude impure phthalocyanine with an organic acid of the formula R-X, or reacting an appropriate crude impure phthalocyanine with an organic acid of the formula R-X, and subsequently mixing an organic solvent with the resulting reaction mixture, mixing a precipitating agent with the reaction mixture, and separating the desired pure phthalocyanines therefrom. There results a phthalocyanine of high purity, 99.95 percent or greater.

Illustrative examples of phthalocyanines that can be purified in accordance with the process of the present invention include crude impure phthalocyanines available for use as pigments in the paint industry, for example, and other similar types of phthalocyanines containing impurities therein such as metal impurities, and the like. Specific illustrative examples of phthalocyanines that can be purified in accordance with the process of the present invention include those disclosed in Byrne, U.S. Pat. No. 3,816,118, such as metal phthalocyanines, metal-free phthalocyanines, and the like. Examples of metal phthalocyanines include cadmium phthalocyanine, substituted, or unsubstituted, copper phthalocyanine, zinc phthalocyanine, and the like, while examples of metal-free phthalocyanines include the X-form of metal-free phthalocyanine, and the like. A preferred phthalocyanine purified in accordance with the process of the present invention is vanadyl phthalocyanine.

Examples of other substances that can be purified in accordance with the process of the present invention include known impure squaraines and joulindinyol squaraines. Specific illustrative examples of squarylium pigments that can be purified in accordance with the process of the present invention include those of the formula:

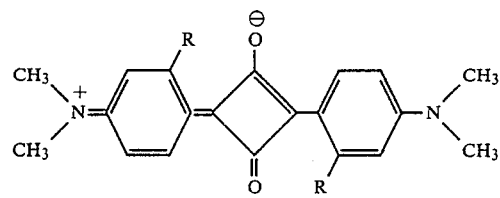

wherein R is hydrogen, an alkyl group such as methyl, or a hydroxy group.

Other impure pigment compositions can be purified in accordance with the process of the present invention, providing that the pigments involved exhibit, for example, satisfactory solubility in organic acids. Accordingly, the process of the present invention would be applicable to numerous other pigments in general including those described in (1) the color index (second and third edition, Vols. 2 and 3) by the Society of Dyes and Colorists, Dean House Piccadilly Bradford, Yorkshire, England, and the American Association of Textile Chemists and Colorists, Lowell Technological Institute, Lowell, Mass., U.S.A., (2) The Chemistry of Synthetic Dyes, Vols. I and II, by K. Venkataraman, Academic Press, Inc., 1952, (3) The Chemistry of Synthetic Dyes and Pigments, edited by H. A. Lubs, American Chemical Society Monograph Series, Hafner Publishing Company, Darien, Conn., 1970; the disclosure of each of these publications being totally incorporated herein by reference.

As the organic acid there may be selected those acids of the formula R-X, wherein R is an alkyl group, containing from about 4 carbon atoms to about 22 carbon atoms, an aryl group, including naphthyl groups, or cycloalkyl groups, and the like, and X is a group capable of yielding anions, such as —SO$_3$H, —OSO$_3$H, or

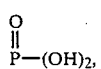

and the like. The organic R groups may contain substituents thereon, or may be unsubstituted, examples of substituents including halogen, hydroxy, ethers, carboxyl substituents, nitro, nitrile, or mixtures thereof, and the like.

Illustrative examples of alkyl groups selected for the organic acid include butyl, pentyl, hexyl, octyl, nonyl, decyl, pentadecyl, eicosyl, and the like, which alkyl groups may be saturated or unsaturated. Examples of aryl substituents that may be selected for the organic acid include those containing from about 6 to about 24 carbon atoms such as phenyl, napthyl, and the like; while examples of cycloalkyl groups include cyclohexyl, and the like.

Illustrative specific examples of organic acids selected for use in the process of the present invention include nonyl phenol sulfonic acid, octyl phenol sulfonic acids, dodecyl phenol sulfonic acids, alkylnaphthalene sulfonic acids, dodecylbenzene sulfonic acids, and the like. These acids have, for example, the following formulas:

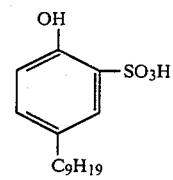

1.

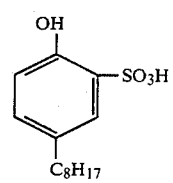

2.

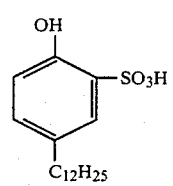

3.

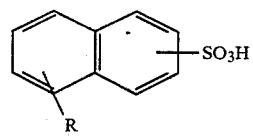

4.

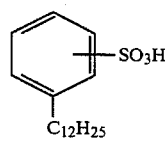

5.

While it is not desired to be limited by theory, it is believed that the large organic anion groups A, contained on the organic acid R-X, allows for the solubilization in organic solvents, of the phthalocyanines, or other pigments being purified in accordance with the process of the present invention, and further it is believed the reaction of the pigments, such as phthalocyanines, with the organic acids in accordance with the process of the present invention, results in either a protonated form of the corresponding phthalocyanines, and/or phthalocyanine salt type compositions.

Various organic solvents can be selected for use in the process of the present invention including, for example, commercially available halogenated solvents, such as methylene chloride, ethylene chloride, and the like; and aromatic solvents such as toluene, and the like. Other solvents not specifically described herein can be selected for the process of the present invention providing these solvents effect solubilization of the impure pigments being treated. By solubilization in accordance with the process of the present invention is meant that the impure crude pigment particles being treated are substantially completely dissolved and little or no solid pigment material is present in the resulting solvent-solute mixture.

Subsequent to solubilization in the organic solvents mentioned herein there results a solution of the pigments, such as the impure crude phthal ocyanine pigments. Accordingly, in order to obtain the desired pure product in accordance with the process of the present invention, there is added to the solution a suitable precipitating agent. Thus, for example, the pigments contained in the solution, such as vanadyl phthalocyanine, are caused to precipitate, or crystallize by the addition of a precipitating agent, which functions as a base, and as a non-solvent. Examples of precipitating agents include various known alcohols, including methanol, ethanol, butanol, isopropanol, 1-propanol, mixtures thereof, ethyl ketone, methyl ketone, dimethyl formamide and the like, aromatic precipitating agents such as toluene, and mixture thereof. These precipitating agents can also contain organic and inorganic bases, such as triethylamine, ammonia, and the like. Other precipitating agents not specifically described herein can be selected providing the objectives of the present invention are accomplished.

In one specific preferred embodiment of the present invention, the crude impure phthalocyanines being treated are optionally soaked in an acid and/or basic medium for the purpose of removing surface contaminants therefrom. The resulting phthalocyanines are then reacted with the organic acid R-X, such as dodecyl benzene sulfonic acid, at a temperature of from about −20 degrees Centigrade, to 100 degrees Centigrade, and preferably at a temperature of from about 10 degrees Centigrade to about 35 degrees Centigrade. This reaction is accomplished in the presence of an organic solvent, or alternatively, the organic solvent can be added in the reaction mixture containing the phthalocyanine organic acid composition. Subsequently, there is added to the mixture with stirring, a precipitating agent, causing the phthalocyanine pigment to crystallize from the solution mixture. The phthalocyanine precipitated product is then separated from the solution mixture by known techniques, including filtration.

The amount of reactants selected will generally vary over wide ranges depending, for example, on the specific organic acid used, however, generally the impure crude phthalocyanine pigments, or other pigments being treated, are present in a ratio of from about 1 mole of pigment to about 1 to about 10 moles, or more, of the organic acid. The organic solvent is generally present in an amount of from about 1 liter per mole of acid, to about 40 liters per mole of acid, and preferably the organic solvent is present in an amount ranging from about 1.5 liters per mole of organic acid, to about 20 liters per mole of organic acid.

The precipitating agent can also be added to the reaction mixture in various amounts providing the objectives of the present invention are achieved, however, generally from about 2 liters to about 80 liters of precipitating agent per mole of organic acid are selected, and preferably from about 3 liters to about 40 liters of precipitating agent per mole of organic acid are used.

The process of the present invention, which can be repeated a number of times as desired in order to perhaps remove further contaminations, consumes a period of time ranging from about 6 hours to about 60 hours, although in some situations the time period involved can be greater than 60 hours depending, for example, on the specific reactants selected, the temperature used, and other reaction parameters. In one specific preferred embodiment of the present invention a pure vanadyl phthalocyanine is obtained from an impure crude vanadyl phthalocyanine in a time period of from about 15 hours to about 20 hours.

The resulting phthalocyanine products have a purity of 99.95 percent or greater as evidenced by subjecting the purified product to Circular Thin Layer chromatography, electrochemical analysis, and standard trace metal, and non-metal analysis. Thus, for example, vanadyl phthalocyanine purified in accordance with the process of the present invention has a purity of 99.95 percent as determined by these methods, and contains only minor amounts of trace residual acid impurities such as phthalic, or other acid derivitives, and the like.

Examples of specific products formed subsequent to the treatment of impure crude phthalocyanines with the organic acids disclosed include those of the formulas:

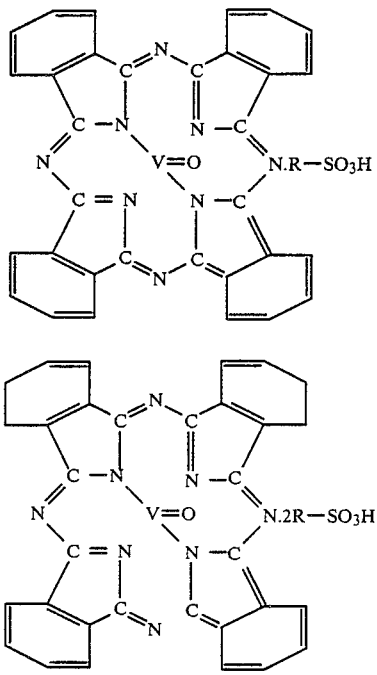

wherein R is as defined herein.

Moreover, the process of the present invention results in pigments wherein the crystal structure thereof has the required morphology for electrophotographic usage. However, depending on the solvents selected for the precipitation or crystallization step other morphologies, may also be obtained.

The pigments, such as phthalocyanine purified in accordance with the process of the present invention, particularly vanadyl phthalocyanine, are useful as photoconductive pigments in imaging devices. More specifically, many of the phthalocyanines produced in accordance with the process of the present invention, such as vanadyl phthalocyanine can be incorporated into layered imaging devices, as photogenerating pigments. Furthermore, certain of the phthalocyanine materials produced in accordance with the process of the present invention are sensitive to light, in the visible and/or infrared region of the spectrum enabling these materials to be used in imaging and printing devices wherein as the source of light there is used gallium arsenide lasers, for example.

The following examples illustrate the preferred embodiments of the present invention, which examples are not intended to limit the scope of the present invention, it being noted that various alternative parameters which are not specifically mentioned are included within the scope of the present invention. Parts and percentages are by weight unless otherwise indicated. The purity of the resulting phthalocyanines was determined by Circular Thin Layer chromatography and standard chemical analysis for metal and non-metal impurities.

Other modifications of the present invention will occur to those skilled in the art based upon a reading of the disclosure of the present application, and these modifications are intended to be included within the scope of the present invention.

EXAMPLE I

Crude impure vanadyl phthalocyanine, 1.12 grams, commercially available from Eastman Kodak, was stirred and dissolved in 1.5 to 2 hours, at room temperature, 25 degrees Centigrade, into a solution containing 5.22 grams of the organic acid dodecylbenzene sulfonic acid, and 15 milliliters of methylene chloride.

The resulting solution was subjected to crystallization by the dropwise addition of 30 milliliters of a toluene-ethanol solution, 1:1 by volume. There results a solution slurry which was stirred for 0.5 hours. The resulting precipitate of vanadyl phthalocyanine contained in the solution mixture was slurry washed by centrifuging, decanting, and reslurring with three 50 milliliter portions of a 1:1 by volume solution of methylene chloride and ethanol, two 50 milliliter portions of methyl ethyl ketone, one portion of 51.4 milliliter of methyl ethyl ketone-triethylamine solution in a volume ratio of 50:1.4, and three 50 milliliter portions of a solution of methylene chloride and ethanol, in a ratio of 1:1 by volume.

The resulting vanadyl phthalocyanine pigment was then filtered from the solution mixture, followed by drying at 80 degrees Centigrade in a vacuum oven for 2 hours. Subsequently, the resulting vanadyl phthalocyanine was soaked in a solution of 50 milliliters of ethanol, and 6 milliliters of ammonium hydroxide, for 18 hours. After filtration, the separated vanadyl phthalocyanine cake was washed with ethanol followed by drying at 80 degrees Centigrade in a vacuum oven for 2 hours. There resulted a vanadyl phthalocyanine of a purity of 99.95 percent as determined by Circular Thin Layer chromatography, and chemical analysis for metal and non-metal impurities.

A photoresponsive device was then prepared with the above prepared vanadyl phthalocyanine by providing an aluminized Mylar substrate in a thickness of 3 mils, and applying thereto a layer of 0.5 percent by weight of duPont 49,000 adhesive, in methylene chloride and 1,1,2-trichloroethane 4:1 volume with a Bird applicator. The layer was allowed to dry for one minute at room temperature, and 10 minutes at 100 degrees Centigrade in a forced air oven. The dry thickness of the resulting layer was 0.05 microns.

A photoconductive layer containing 30 percent by volume of vanadyl phthalocyanine was then prepared as follows:

In a 2 oz. amber bottle was added 0.76 grams of duPont 49,000 polyester in 16 milliliters methylene chloride. Added to this solution was 0.36 grams of the above prepared vanadyl phthalocyanine, and 100 grams ⅛" stainless steel shot. The above mixture was placed on a ball mill for 24 hours. To 5 grams of this slurry was added 10 milliliters of methylene chloride. This slurry was coated on the above polyester adhesive layer with a Bird applicator, to a wet thickness of 0.5 mils, and this layer was allowed to air dry for 5 minutes. Subsequently, the resulting device was dried at 135 degrees Centigrade for 6 minutes in a forced air oven. The dry thickness was 0.5 microns.

The above photoconductive layer was then overcoated with a charge transport layer which was prepared as follows:

A transport layer containing 50 percent by weight Makrolon ®, a polycarbonate resin having a molecular weight ($M_w$) of from about 50,000 to about 100,000 available from Larbensabricken Bayer A.G., was mixed with 50 percent by weight N,N'-diphenyl-N,N'-bis(3-methylphenyl)1,1'-biphenyl-4,4'-diamine. This solution was then mixed in 15 percent by weight of methylene chloride. All of these components were placed into an amber bottle and dissolved. The mixture was coated to a dry 25 micron thickness layer on top of the above photoconductive layer using a Bird applicator. During this coating process humidity was equal to or less than 15 percent.

The resulting device containing all of the above layers was annealed at 135 degrees Centigrade in a forced air oven for 6 minutes.

EXAMPLE II

The procedure of Example I was repeated, and there was obtained vanadyl phthalocyanine of a purity of 99.95 percent as determined by Circular Thin Layer chromatography, and chemical analysis for metal and non-metal impurities. Subsequently, the resulting vanadyl phthalocyanine was added with stirring into a solution containing 5.22 grams of the organic acid dodecylbenzene sulfonic acid, and 15 milliliters of methylene chloride, causing the vanadyl phthalocyanine to dissolve therein, this reaction occuring at room temperature, about 25 degrees Centigrade.

The resulting solution mixture was then subjected to crystallization by the dropwise addition of 30 milliliters of a 1:1 by volume solution of toluene and ethanol. There was obtained a slurry which was stirred for 0.5 hours. The resulting precipitate of vanadyl phthalocyanine contained in the reaction mixture was then slurry washed by centrifuging, decanting, and reslurring with three 50 milliliter portions of a 1:1 volume solution of methylene chloride and ethanol, two 50 milliliter portions of methyl ethyl ketone, one portion of 51.4 milliliters of a methyl ethyl ketone-triethylamine solution in a volume ratio of 50:1.4, and three 50 milliliter portions of a 1:1 by volume solution of methylene chloride and ethanol. The resulting vanadyl phthalocyanine was then filtered from the reaction mixture, and dried at 80 degrees Centigrade in a vacuum oven for 2 hours. Subsequently the vanadyl phthalocyanine was soaked in a solution of 50 milliliters of ethanol, and 6 milliliters of ammonium hydroxide for 18 hours. Thereafter, the resulting vanadyl phthalocyanine product was filtered, and the filtered cake was washed with ethanol, followed by drying at 80 degrees Centigrade in a vacuum oven for over 2 hours.

There resulted a vanadyl phthalocyanine of a purity of about 99.995 percent, which purity was determined in accordance with the procedure of Example I.

A photoresponsive device was then prepared by repeating the procedure of Example I resulting in a device containing an aluminized Mylar substrate, an adhesive layer, a vanadyl phthalocyanine photoconductive layer, containing the vanadyl phthalocyanine pigment prepared in accordance with Example II, and a charge transport layer containing an amine dispersed in a polycarbonate resin.

EXAMPLE III

The procedure of Example II was repeated with the exception that the resulting vanadyl phthalocyanine was subjected to a third purification step by adding the resulting phthalocyanine 1.12 grams to a solution containing 5.22 grams of dodecylbenzene sulfonic acid in 15 milliliters of methylene chloride at room temperature. After precipitation with ethanol in accordance with the process of Example II, vanadyl phthalocyanine of a purity of 99.999 percent resulted, which purity was determined in accordance with the procedure of Example II.

The photoresponsive device was then prepared by repeating the procedure of Example I resulting in a device containing an aluminized Mylar substrate, an adhesive layer, a vanadyl phthalocyanine photoconductive layer, containing the vanadyl phthalocyanine prepared in accordance with Example III, and a charge transport layer containing an amine dispersed in a polycarbonate resinous binder.

EXAMPLE IV

Crude impure vanadyl phthalocyanine, 10 grams, commercially available from Eastman Kodak, was added to a solution of 15 grams of the organic acid dodecylbenzene sulfonic acid and 40 milliliters of toluene. The solution was stirred for 24 hours. Subsequently, 5 milliliters of dimethylformamide was added as a precipitating agent causing the vanadyl phthalocyanine to crystallize in the solution. The resulting precipitate was then separated from the reaction mixture by filtration, and washed with 500 milliliter portions of toluene until there resulted a clear filtrate. Thereafter, the vanadyl phthalocyanine powder was air dried at room temperature.

A portion of the above-treated vanadyl phthalocyanine, 1.12 grams, was stirred and dissolved in 1.5 to 2 hours at room temperature into a solution containing 5.22 grams of the organic acid dodecylbenzene sulfonic acid and 15 milliliters of methylene chloride. The resulting solution was subjected to crystallization by the dropwise addition of 30 milliliters of a toluene-ethanol solution, 1:1 by volume. There results a solution slurry which was stirred for 0.5 hours. The resulting precipitate of vanadyl phthalocyanine contained in the solution mixture was slurry washed by centrifuging, decanting, and reslurring with three 50 milliliter portions of a 1:1 by volume solution of methylene chloride and ehtanol, two 50 milliliter portions of methyl ethyl ketone, one portion of 51.4 milliliter of methyl ethyl ketone-triethylamine solution in a volume ration of 50:1.4, and three 50 milliliter portions of a solution of methylene chloride and ethanol, in a ratio of 1:1 by volume.

The vanadyl phthalocyanine pigment obtained was then filtered from the solution mixture, followed by drying at 80 degrees Centigrade in a vacuum oven for 2 hours. Subsequently, the vanadyl phthalocyanine was soaked in a solution of 50 milliliters of ethanol, and 6 milliliters of ammonium hydroxide, for 18 hours. After filtration, the separated vanadyl phthalocyanine cake was washed with ethanol followed by drying at 80 degrees Centigrade in a vacuum oven for 2 hours. There resulted a vanadyl phthalocyanine of a purity of 99.95 percent as determined by Circular Thin Layer chromatography, and chemical analysis for metal and non-metal impurities.

A photoresponsive device containing the above vanadyl phthalocyanine was then prepared by providing an aluminized Mylar substrate in a thickness of 3 mils, and applying thereto a layer of 0.5 percent by weight of duPont 49,000 adhesive, in methylene chloride and 1,1,2-trichloroethane 4:1 volume with a Bird applicator. The layer was allowed to dry for one minute at room temperature, and 10 minutes at 100 degrees Centigrade in a forced air oven. The dry thickness of the resulting layer was 0.05 microns.

A photoconductive layer containing 30 percent by volume of vanadyl phthalocyanine was then prepared as follows:

In a 2 oz. amber bottle was added 0.76 grams of duPont 49,000 polyester in 16 milliliters methylene chloride. Added to this solution was 0.36 grams of the above prepared vanadyl phthalocyanine, and 100 grams ⅛" stainless steel shot. The above mixture was placed on a ball mill for 24 hours. To 5 grams of this slurry was added 10 milliliters of methylene chloride. This slurry was coated on the above polyester adhesive layer with a Bird applicator, to a wet thickness of 0.5 mils, and this layer was allowed to air dry for 5 minutes. Subsequently, the resulting device was dried at 135 degres Centigrade for 6 minutes in a forced air oven. The dry thickness was 0.5 microns.

The above photoconductive layer was then overcoated with a charge transport layer which was prepared as follows:

A transport layer containing 50 percent by weight Makrolon ®, a polycarbonate resin having a molecular weight ($M_w$) of from about 50,000 to about 100,000 available from Larbensabricken Bayer A.G., was mixed with 50 percent by weight N,N'-diphenyl-N,N'-bis(3-methylphenyl)1,1'-biphenyl-4,4'-diamine. This solution was then mixed in 15 percent by weight of methylene chloride. All of these components were placed into an amber bottle and dissolved. The mixture was coated to a dry 25 micron thickness layer on top of the above photoconductive layer using a Bird applicator. During this coating process humidity was equal to or less than 15 percent.

The resulting device containing all the above layers was annealed at 135 degrees Centigrade in a forced air oven for 6 minutes.

EXAMPLE V

Crude impure vanadyl phthalocyanine, 10.0 grams, commercially available from Eastman Kodak, was added dropwise to a solution of 20 milliliters of benzyltrimethyl ammonium hydroxide in methanol, (40 percent) and 80 milliliters of dimethylformamide, followed by stirring for 24 hours. Subsequently, the resulting vanadyl phthalocyanine precipitate was filtered, and washed with dimethylformamide, 500 milliliter portions, until the filtrate was clear in color. Washing was then accomplished with 300 milliliter portions of methanol and ethanol, followed by drying the resulting powder in air at room temperature.

A portion of the above treated vanadyl phthalocyanine, 1.12 grams was stirred and dissolved in 1.5 to 2 hours at room temperature into a solution containing 5.22 grams of the organic acid dodecylbenzene sulfonic acid, and 15 milliliters of methylene chloride.

The resulting solution was subjected to crystallization by the dropwise addition of 30 milliliters of a toluene-ethanol solution, 1:1 by volume. There was obtained a solution slurry which was stirred for 0.5 hours. The resulting precipitate of vanadyl phthalocyanine contained in the solution mixture was slurry washed by centrifuging, decanting, and reslurring with three 50 milliliter portions of a 1:1 by volume solution of methylene chloride and ethanol, two 50 milliliter portions of methyl ethyl ketone, one portion of 51.4 milliliter of a methyl ethyl ketone-triethylamine solution in a volume ratio of 50:1.4, and three 50 milliliter portions of a solution of methylene chloride and ethanol, in a ratio of 1:1 by volume.

The resulting vanadyl phthalocyanine pigment was then filtered from the solution mixture, followed by drying at 80 degrees Centigrade in a vacuum oven for 2 hours. Subsequently, the resulting vanadyl phthalocyanine was soaked in a solution of 50 milliliters of ethanol, and 6 milliliters of ammonium hydroxide, for 18 hours. After filtration, the separated vanadyl phthalocyanine cake was washed with ethanol followed by drying at 80 degrees Centigrade in a vacuum oven for 2 hours. There resulted a vanadyl phthalocyanine of a purity of 99.95 percent as determined by Circular Thin Layer chromatography, and chemical analysis for metal and non-metal impurities.

A photoresponsive device containing the above vanadyl phthalocyanine was then prepared by providing an aluminized Mylar substrate in a thickness of 3 mils, and applying thereto a layer of 0.5 percent by weight of duPont 49,000 adhesive, in methylene chloride and 1,1,2-trichloroethane 4:1 volume with a Bird applicator. The layer was allowed to dry for one minute at room temperature, and 10 minutes at 100 degrees Centigrade in a forced air oven. The dry thickness of the resulting layer was 0.05 microns.

A photoconductive layer containing 30 percent by volume of vanadyl phthalocyanine was then prepared as follows:

In a 2 oz. amber bottle was added 0.76 grams of duPont 49,000 polyester in 16 milliliters methylene chloride. Added to this solution was 0.36 grams of the above prepared vanadyl phthalocyanine, and 100 grams ⅛" stainless steel shot. The above mixture was placed on a ball mill for 24 hours. To 5 grams of this slurry was added 10 milliliters of methylene chloride. This slurry was coated on the above polyester adhesive layer with a Bird applicator, to a wet thickness of 0.5 mils, and this layer was allowed to air dry for 5 minutes. Subsequently, the resulting device was dried at 135 degrees Centigrade for 6 minutes in a forced air oven. The dry thickness was 0.5 microns.

The above photoconductive layer was then overcoated with a charge transport layer which was prepared as follows:

A transport layer containing 50 percent by weight Makrolon ®, a polycarbonate resin having a molecular weight ($M_w$) of from about 50,000 to about 100,000 available from Larbensabricken Bayer A.G., was mixed with 50 percent by weight N,N'-diphenyl-N,N'-bis(3- methylphenyl)1,1'-biphenyl-4,4'-diamine. This solution was then mixed in 15 percent by weight of methylene chloride. All of these components were placed into an amber bottle and dissolved. The mixture was coated to a dry 25 micron thickness layer on top of the above photoconductive layer using a Bird applicator. During this coating process humidity was equal to or less than 15 percent.

The resulting device containing all of the above layers was annealed at 135 degrees Centigrade in a forced air oven for 6 minutes.

EXAMPLE VI

Crude impure copper phthalocyanine, 10 grams, available from Eastman Kodak was slurried in a solution of 15 grams of the organic acid dodecylbenzene sulfonic acid, in 40 milliliters of toluene, for 24 hours. Dimethylformamide, 5 milliliters, was then added to the solution mixture resulting in a precipitate of copper phthalocyanine. This precipitate was separated from the reaction mixture by filtration, and the resulting product was washed with toluene, 500 milliliter portions, until the filtrate was clear in color.

A portion of the above treated copper phthalocyanine, 1.12 grams was stirred and dissolved in 1.5 to 2 hours at room temperature, into a solution containing 5.22 grams of dodecylbenzene sulfonic acid and 15 milliliters of methylene chloride. The resulting solution was subjected to crystallization by the dropwise addition of 30 milliliters of a toluene-ethanol solution, 1:1 by volume. There results a solution slurry which was stirred for 0.5 hours. The resulting precipitate of copper phthalocyanine contained in the solution mixture was slurry washed by centrifuging, decanting, and reslurring with three 50 milliliter portions of a 1:1 by volume solution of methylene chloride and ethanol, two 50 milliliter portions of methyl ethyl ketone, one portion of 51.4 milliliter of methyl ethyl ketone-triethylamine solution in a volume ratio of 50:1.4, and three 50 milliliter portions of a solution of methylene chloride and ethanol, in a ratio of 1:1 by volume.

The copper phthalocyanine pigment obtained was then filtered from the solution mixture, followed by drying at 80 degrees Centigrade in a hvacuum oven for 2 hours. Subsequently, the resulting copper phthalocyanine was soaked in a solution of 50 milliliters of ethanol, and 6 milliliters of ammonium hydroxide, for 18 hours. After filtration, the separated copper phthalocyanine cake was washed with ethanol followed by drying at 80 degrees Centigrade in a vacuum oven for 2 hours. There resulted a copper phthalocyanine of a purity of 99.95 percent as determined by Circular Thin Layer chromatography, and chemical analysis for metal and non-metal impurities.

A photoresponsive device was then prepared by providing an aluminized Mylar substrate in a thickness of 3 mils, and applying thereto a layer of 0.5 percent by weight of duPont 49,000 adhesive, in methylene chloride and 1,1,2-trichloroethane 4:1 volume with a Bird applicator. The layer was allowed to dry for one minute at room temperature, and 10 minutes at 100 degrees Centigrade in a forced air oven. The dry thickness of the resulting layer was 0.05 microns.

A photoconductive layer containing 30 percent by volume of copper phthalocyanine was then prepared as follows:

In a 2 oz. amber bottle was added 0.76 grams of du-Pont 49,000 polyester in 16 milliliters methylene chloride. Added to this solution was 0.36 grams of the above prepared copper phthalocyanine, and 100 grams ⅛" stainless steel shot. The above mixture was placed on a ball mill for 24 hours. To 5 grams of this slurry was added 10 milliliters of methylene chloride. This slurry was coated on the above polyester adhesive layer with a Bird applicator, to a wet thickness of 0.5 mils, and this layer was allowed to dry for 5 minutes. Subsequently, the resulting device was dried at 135 degrees Centigrade for 6 minutes in a forced air oven. The dry thickness was 0.5 microns.

The above photoconductive layer was then overcoated with a charge transport layer which was prepared as follows:

A transport layer containing 50 percent by weight Makrolon ®, a polycarbonate resin having a molecular weight ($M_w$) of from about 50,000 to about 100,000 available from Larbensabricken Bayer A.G., was mixed with 50 percent by weight N,N'-diphenyl-N,N'-bis(3-methylphenyl)1,1'-biphenyl-4,4'-diamine. This solution was then mixed in 15 percent by weight of methylene chloride. All of these components were placed into an amber bottle and dissolved. The mixture was coated to a dry 25 micron thickness layer on top of the above copper phthalocyanine layer using a Bird applicator. During this coating process humidity was equal to or less than 15 percent.

The resulting device containing all of the above layers was annealed at 135 degrees Centigrade in a forced air oven for 6 minutes.

EXAMPLE VII

Crude impure copper phthalocyanine, 10.0 grams, commercially available from Eastman Kodak, was slurried in a solution of 20 milliliters of 40 percent by volume of benzyltrimethyl ammonium hydroxide, in methanol, and 80 milliliters of dimethylformamide for 24 hours. The resulting copper phthalocyanine was then filtered, followed by washing the filter cake with dimethylformamide until the filtrate was clear in color. Subsequently, the copper phthalocyanine filter cake was washed with 500 milliliter portions of methanol and ethanol, and the resulting copper phthalocyanine powder was air dried at room temperature.

The above treated copper phthalocyanine, 1.12 grams was stirred and dissolved in 1.5 to 2 hours at room temperature into a solution containing 5.22 grams of dodecylbenzene sulfonic acid, and 15 milliliters of methylene chloride. The reulting solution was subjected to crystallization by dropwise addition of 30 milliliters of a toluene-ethanol solution, 1:1 by volume. There results a solution slurry which was stirred for 0.5 hours. The resulting precipitate of copper phthalocyanine contained in the solution mixture was slurry washed by centrifuging, decanting, and reslurring with three 50 milliliter portions of a 1:1 by volume solution of methylene chloride and ethanol, two 50 milliliter portions of methyl ethyl ketone, one portion of 51.4 milliliter of methyl ethyl ketone-triethylamine solution in a volume ratio of 50:1.4, and three 50 milliliter portions of a solution of methylene chloride and ethanol, in a ratio of 1:1 by volume.

The copper phthalocyanine pigment obtained was then filtered from the solution mixture, followed by drying at 80 degrees Centigrade in a vacuum oven for 2 hours. Subsequently, the resulting copper phthalocyanine was soaked in a solution of 50 milliliters of ethanol, and 6 milliliters of ammonium hydroxide, for 18 hours.

After filtration, the separated copper phthalocyanine cake was washed with ethanol followed by drying at 80 degrees Centigrade in a vacuum oven for 2 hours. There resulted a copper phthalocyanine of a purity of 99.95 percent as determined by Circular Thin Layer chromatography, and chemical analysis for metal and non-metal impurities.

A photoresponsive device was then prepared by providing an aluminized Mylar substrate in a thickness of 3 mils, and applying thereto a layer of 0.5 percent by weight of duPont 49,000 adhesive, in methylene chloride and 1,1,2-trichloroethane 4:1 volume with a Bird applicator. The layer was allowed to dry for one minute at room temperature, and 10 minutes at 100 degrees Centigrade in a forced air oven. The dry thickness of the resulting layer was 0.05 microns.

A photoconductive layer containing 30 percent by volume of copper phthalocyanine was then prepared as follows:

In a 2 oz. amber bottle was added 0.76 grams of du-Pont 49,000 polyester in 16 milliliters of methylene chloride. Added to this solution was 0.36 grams of the above prepared copper phthalocyanine, and 100 grams ⅛" stainless steel shot. The above mixture was placed on a ball mill for 4 hours. To 5 grams of this slurry was added 10 milliliters of methylene chloride. This slurry was coated on the above polyester adhesive layer with a Bird applicator, to a wet thickness of 0.5 mils, and this layer was allowed to air dry for 5 minutes. Subsequently, the resulting device was dried at 135 degrees Centigrade for 6 minutes in a forced air oven. The dry thickness was 0.5 microns.

The above photoconductive layer was then overcoated with a charge transport layer which was prepared as follows:

A transport layer containing 50 percent by weight Makrolon ®, a polycarbonate resin having a molecular weight ($M_w$) of from about 50,000 to about 100,000 available from Larbensabricken Bayer A.G., was mixed with 50 percent by weight N,N'-diphenyl-N,N'-bis(3-methylphenyl)1,1'-biphenyl-4,4'-diamine. This solution was then mixed in 15 percent by weight of methylene chloride. All of these components were placed into an amber bottle and dissolved. The mixture was coated to a dry 25 micron thickness layer on top of the above copper phthalocyanine layer using a Bird applicator. During this coating process humidity was equal to or less than 15 percent.

The resulting device containing all of the above layers was annealed at 135 degrees Centigrade in a forced air oven for 6 minutes.

EXAMPLE VIII

Crude impure hydroxy squarylium, 10.0 grams, was slurried in a solution of 15 grams of the organic acid dodecylbenzene sulfonic acid, in 40 milliliters of toluene, for 24 hours. Five milliliters of dimethylformamide was then added to the solution, and the resulting hydroxy squaraine precipitate was separated from the reaction mixture by filtration. The hydroxy squaraine filter cake was then washed with 500 milliliter portions of toluene until the filtrate was clear in color, followed by air drying the powder at room temperature.

A portion of the above treated hydroxy squaraine, 1.12 grams was stirred and dissolved in 1.5 to 2 hours at room temperature into a solution containing 5.22 grams of dodecylbenzene sulfonic acid, and 15 milliliters of methylene chloride.

The resulting solution was subjected to crystallization by the dropwise addition of 30 milliliters of a toluene-ethanol solution, 1:1 by volume. There results a solution slurry which was stirred for 0.5 hours. The obtained precipitate of hydroxy squarylium contained in the solution mixture was slurry washed by centrifuging, decanting, and reslurring with three 50 milliliter portions of a 1:1 by volume solution of methylene chloride and ethanol, two 50 milliliter portions of methyl ethyl ketone, one portion of 51.4 milliliters of methyl ethyl ketone-triethylamine solution in a volume ratio of 50:1.4, and three 50 milliliter portions of a solution of methylene chloride and ethanol, in a ratio of 1:1 by volume.

The resulting hydroxy squarylium pigment was then filtered from the solution mixture, followed by drying at 80 degrees Centigrade in a vacuum oven for 2 hours. Subsequently, the hydroxy squarylium was soaked in a solution of 50 milliliters of ethanol, and 6 milliliters of ammonium hydroxide, for 18 hours. After filtration, the separated hydroxy squarylium cake was washed with ethanol followed by drying at 80 degrees Centigrade in a vacuum oven for 2 hours. There resulted a hydroxy squarylium of a purity of 99.95 percent as determined by Circular Thin Layer chromatography, and chemical analysis for metal and non-metal impurities.

A photoreceptive device was then prepared by providing an aluminized Mylar substrate in a thickness of 3 mils, and applying thereto in a wet thickness of 0.5 mils, a layer of 0.5 percent weight of duPont 49,000 polyester adhesive, in methylene chloride and 1,1,2-trichloroethane (4:1 volume ratio) with a Bird applicator. The layer was allowed to dry for one minute at room temperature, and 10 minutes at 100 degrees Centigrade in a forced air oven. The resulting layer had a dry thickness of 0.05 microns.

A photoconductive layer containing 30 percent by volume of the above prepared hydroxy squarylium was then prepared as follows:

In a 2 oz. amber bottle was added 0.76 grams Formvar 12/85, commercially available from Monsanto Chemical Company and 16 milliliters of tetrahydrofuran. Added to this solution was 0.36 grams of the above prepared hydroxy squarylium, and 100 grams ⅛" stainless steel shot. The above mixture was placed on a ball mill for 25 hours. To 5 grams of this slurry was added 10 milliliters of tetrahydrofuran. This slurry was then coated on the above adhesive layer with a Bird applicator, to a wet thickness of 0.5 mils. The resulting layer was allowed to air dry for 5 minutes. This device was dried at 135 degrees Centigrade for 6 minutes in a forced air oven. The dry thickness of the photoconductive layer was 0.5 microns.

The above photoconductive layer was overcoated with a charge transport layer which was prepared as follows:

A transport layer containing 50 percent by weight Makrolon ®, a polycarbonate resin having a molecular weight ($M_w$) of from about 50,000 to about 100,000 available from Larbensabricken Bayer A.G., was mixed with 50 percent by weight N,N'-diphenyl-N,N'-bis(3-methylphenyl)1,1:-biphenyl-4,4-diamine. This solution was mixed in 15 percent by weight of methylene chloride. All of these components were placed into an amber bottle and dissolved. The mixture was coated to a dry 25 micron thickness layer on top of the above hydroxy squarylium layer using a Bird applicator. During this coating process humidity was equal to or less than 15 percent.

The resulting device containing all of the above layers was annealed at 135 degrees Centigrade in a forced air oven for 6 minutes.

Each of the above prepared photoresponsive devices were then tested for photosensitivity in the visible and infrared region of the spectrum by negatively charging the devices with a corona to a −800 volts, followed by simultaneously exposing each device to monochromatic light in a wavelength range of from about 400 to about 1,000 nanometers. The surface potential of each device was then measured with an electrical probe after exposure to the given wavelengths.

The photoresponse devices of Examples I, II, III, IV, and V, VI, VII, and VIII responded to light in the wavelength region of about 580 to 950 nanometers.

Although the invention has been described with reference to specific preferred embodiments, it is not intended to be limited thereto, rather those skilled in the art will recognize variations and modifications may be made therein which are within the spirit of the invention and within the scope of the following claims:

We claim:

1. A process for the preparation of pigments of high purity which comprises reacting in the presence of an organic solvent an appropriate impure pigment with an organic acid of the formula R-X, or comprises reacting an appropriate impure pigment with an organic acid of the formula R-X, and subsequently mixing an organic solvent with the resulting organic mixture, mixing a precipitating agent with the resulting solution mixture, followed by separation of the desired pure pigment from the reaction mixture, wherein R is an alkyl group, containing from about 4 carbon atoms to about 22 carbon atoms, or an aryl group containing from about 6 carbon atoms to about 24 carbon atoms, and X is an anion.

2. A process in accordance with with claim 1 wherein R contains substituents thereon.

3. A process in accordance with claim 1 wherein an X is —SO$_3$H, —OSO$_3$H, or

4. A process in accordance with claim 1 wherein an R is butyl, octyl, decyl, pentadecyl, eicosyl, phenyl, or naphthyl.

5. A process in accordance with claim 1 wherein the organic acids are octyl phenolsulfonic acids, dodecyl phenolsulfonic acids, alkyl naphthalene sulfonic acids, or dodecylbenzene sulfonic acids.

6. A process in accordance with claim 1 wherein the pigments are photoconductive pigments.

7. A process in accordance with claim 1 wherein the pigments are phthalocyanines.

8. A process in accordance with claim 1 wherein the pigments are vanadyl phthalocyanines.

9. A process in accordance with claim 1 wherein the pigments are copper phthalocyanines.

10. A process in accordance with claim 1 wherein the pigments are squaraine compositions.

11. A process in accordance with claim 1 wherein the reaction is accomplished at a temperature of from about −20 degrees centigrade to about 100 degrees centigrade.

12. A process in accordance with claim 1 wherein the ratio of pigment to organic acid is 1 to about 1:10.

13. A process in accordance with claim 1 wherein the pigment is vanadyl phthalocyanine, and the organic acid is dodecylbenzene sulfonic acid.

14. A process in accordance with claim 1 wherein there is obtained vanadyl phthalocyanine in a purity of 99.95 percent, or greater.

15. A process in accordance with claim 1 wherein a halogenated organic solvent, or organic aromatic solvent is selected.

16. A process in accordance with claim 15 wherein the solvent is methylene chloride, ethylene chloride, or toluene.

17. A process in accordance with claim 1 wherein the precipitating agent is an alcohol, a ketone, or an aromatic composition.

18. A process in accordance with claim 17 wherein the precipitating agent is methanol, ethanol, butanol, isopropanol, 1-propanol, ethyl ketone, methyl ketone, toluene, or mixtures thereof.

19. A process for the preparation of phthalocyanine pigments of high purity which consist essentially of reacting in the presence of a halogenated organic solvent, an impure composition selected from the group consisting of phthalocyanines and squaraines, with an organic acid of the formula R-X, or consisting essentially of reacting an impure pigment selected from the group consisting of phthalocyanines and squaraines with an organic acid of the formula R-X, and subsequently mixing a halogenated organic solvent with the resulting mixture; mixing a precipitating agent selected from the group consisting of aliphatic alcohols, alkyl ketones, and toluene, followed by the separation of the desired pure phthalocyanine or squarine composition from the reaction mixture, wherein R is an alkyl group of from about 4 carbon atoms to about 22 carbon atoms, or an aryl group of from about 6 carbon atoms to about 24 carbon atoms, and X is an anion.

20. A process in accordance with claim 19 wherein the phthalocyanine is a metal phthalocyanine, or a metal free phthalocyanine.

21. A process in accordance with claim 19 wherein a hydroxy squaraine is purified.

22. A process in accordance with claim 19 wherein the organic solvent is methylene chloride, or ethylene chloride.

23. A process in accordance with claim 19 wherein the organic acid is selected from the group consisting of nonyl phenol sulfonic acids, octyl phenol sulfonic acids, dodecyl phenol sulfonic acids, alkylnaphthalene sulfonic acids, dodecylbenzene sulfonic acids.

24. A process in accordance with claim 19 wherein the precipitating agent is methanol, ethanol or butanol.

25. A process in accordance with claim 19 wherein the precipitating agent is methyl ketone, ethyl ketone, or dimethyl formamide.

26. A process in accordance with claim 19 wherein R is an alkyl group selected from the group consisting of butyl, pentyl, hexyl, octyl, and nonyl.

27. A process in accordance with claim 19 wherein the R group is phenyl.

28. A process in accordance with claim 19 wherein the R groups are substituted with halogen, hydroxy, ethers, or nitro.

* * * * *